(12) United States Patent
Luo et al.

(10) Patent No.: US 11,814,512 B2
(45) Date of Patent: Nov. 14, 2023

(54) HIGHLY PROCESSABLE MULTI-STAGE FLEXIBLE ACRYLIC RESINS AND PROCESS FOR MAKING SAME

(71) Applicant: Rohm and Haas Company, Collegeville, PA (US)

(72) Inventors: Pu Luo, King Of Prussia, PA (US); Hailan Guo, Warrington, PA (US); Morris Wills, Philadelphia, PA (US)

(73) Assignee: Rohm and Haas Company, Collegeville, PA (US)

( * ) Notice: Subject to any disclaimer, the term of this patent is extended or adjusted under 35 U.S.C. 154(b) by 114 days.

(21) Appl. No.: 17/439,655

(22) PCT Filed: Mar. 13, 2020

(86) PCT No.: PCT/US2020/022537
§ 371 (c)(1),
(2) Date: Sep. 15, 2021

(87) PCT Pub. No.: WO2020/197798
PCT Pub. Date: Oct. 1, 2020

(65) Prior Publication Data
US 2022/0153984 A1  May 19, 2022

Related U.S. Application Data

(60) Provisional application No. 62/825,477, filed on Mar. 28, 2019.

(51) Int. Cl.
| | | |
|---|---|---|
| C08L 51/00 | (2006.01) | |
| B32B 7/027 | (2019.01) | |
| B32B 27/08 | (2006.01) | |
| B32B 27/18 | (2006.01) | |
| B32B 27/30 | (2006.01) | |
| C08F 265/06 | (2006.01) | |
| C08F 285/00 | (2006.01) | |
| C08J 5/18 | (2006.01) | |
| C08F 2/22 | (2006.01) | |
| C08F 2/38 | (2006.01) | |
| C08F 212/08 | (2006.01) | |
| C08F 222/10 | (2006.01) | |

(52) U.S. Cl.
CPC ............ *C08L 51/003* (2013.01); *B32B 7/027* (2019.01); *B32B 27/08* (2013.01); *B32B 27/18* (2013.01); *B32B 27/308* (2013.01); *C08F 265/06* (2013.01); *B32B 2250/246* (2013.01); *B32B 2270/00* (2013.01); *B32B 2307/412* (2013.01); *B32B 2307/54* (2013.01); *B32B 2307/546* (2013.01); *B32B 2307/732* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 4,269,749 A | 5/1981 | Marriott et al. | |
| 6,646,068 B2 | 11/2003 | Chisholm et al. | |
| 7,244,796 B2 | 7/2007 | Chisholm et al. | |
| 7,498,395 B2 | 3/2009 | Chisholm et al. | |
| 10,040,915 B2 | 8/2018 | Guo et al. | |

FOREIGN PATENT DOCUMENTS

| | | |
|---|---|---|
| EP | 566295 A2 * | 10/1993 |
| WO | 199804603 | 2/1998 |
| WO | 2013028402 A2 | 2/2013 |
| WO | 2014035608 | 3/2014 |
| WO | 2017205177 | 11/2017 |

\* cited by examiner

*Primary Examiner* — Ramsey Zacharia
(74) *Attorney, Agent, or Firm* — Brian L. Mutschler

(57) ABSTRACT

A multi-stage flexible acrylic resin comprises a branched polymer which is a reaction product of reactants comprising one or more monoethylenically unsaturated ester monomers, a chain transfer agent in an amount of 0.1 to 10 wt. %, and a crosslinker in an amount of 0.1 to 10 wt. %, wherein wt. % is based on total amount of reactants, provided the amount of crosslinker in moles is less than the amount of chain transfer agent in moles. A process for producing the multi-stage flexible acrylic resin is also disclosed.

13 Claims, No Drawings

HIGHLY PROCESSABLE MULTI-STAGE FLEXIBLE ACRYLIC RESINS AND PROCESS FOR MAKING SAME

FIELD OF THE INVENTION

The field of this invention is multi-stage flexible acrylic resin compositions and processes for making multi-stage flexible acrylic resin compositions.

BACKGROUND

A variety of indoor and outdoor products benefit from use of flexible, transparent and weather resistant plastic materials. Fluorine containing polymers and thermoplastic polyurethanes provide those characteristics but are too expensive for many end uses. Lower cost resins such as polyvinylchloride with plasticizer or polyethylene resins may not meet all performance requirement. Certain of these polymers may have undesirable environmental impact.

Various acrylic resins have also been proposed. However, many are too rigid for certain end uses, possess high moduli or poor tear resistance. One commercial acrylic resin contains block copolymers of poly(methylmethacrylate) and poly(butylacrylate) produced by anionic polymerization. While these resins are flexibly and have whitening resistance, they are prohibitively expensive for certain applications. Multi-stage acrylic polymers have been taught as an alternative (See, e.g., U.S. Pat. No. 10,040,915). These materials tend to be highly viscous (Melt flow index or rates in the range of 15-20 g/10 minutes at 220° C., 10 kg) which makes processing challenging in certain applications.

SUMMARY OF THE INVENTION

Disclosed herein is a multi-stage flexible acrylic resin comprising:
  a) a first stage comprising a crosslinked core having a Tg ranging from −85 to −10° C.;
  b) a second stage comprising one or more layers comprising from 88.5 to 100 wt. % of units derived from one or more monomers selected from the group consisting of alkyl (meth)acrylate monomers, from 0 to 5 wt. % of units derived from a cross-linking monomer, a graft-linking monomer, or a combination of two or more thereof, optionally from 0 to 2 wt. % units of one or more chain transfer agents, wherein there is a compositional gradient between the intermediate layers such that the Tg transitions between a lower Tg and an upper Tg, wherein the lower Tg is at least 0° C. and the upper Tg is 70° C. or less over the width of the second stage;
  c) a third stage comprising one or more layers comprising from 98.5 to 100 wt. % units derived from one or more monomers selected from the group consisting of alkyl (meth)acrylate, styrenic monomers, and combinations of two or more thereof, and from 0 to 1.5 wt. % units derived from one or more chain transfer agents, wherein the third stage has a Tg ranging from 40° C. to 110° C.; and
  d) a fourth stage comprising one or more layers comprising a branched polymer which is a reaction product of reactants comprising one or more monoethylenically unsaturated ester monomers, a chain transfer agent in an amount of 0.1 to 10 wt. %, and a crosslinker in an amount of 0.1 to 10 wt. % of a crosslinker, wherein wt. % is based on total amount of reactants, provided the amount of crosslinker in moles is less than the amount of chain transfer agent in moles.

Another aspect of the present invention relates to a process for forming a multi-stage flexible acrylic resin comprising a branched polymer. The process comprises:
  1) forming the first stage by emulsion polymerization of a first stage reaction mixture comprising 95 to 99.5 wt. % of one or more monomers selected from the group consisting of alkyl (meth)acrylate monomers and 0.1 to 5 wt. % of one or more monomers selected from cross-linking monomers, graft-linking monomers, and mixtures thereof;
  2) forming the second stage by emulsion polymerization of the product of the first stage polymerization and a reaction mixture comprising 93 to 100 wt. % of monomers selected from the group consisting of alkyl (meth)acrylate monomers, 0 to 5 wt. % of one or more monomers selected from cross-linking monomers, graft-linking monomers, and mixtures thereof, and 0 to 2.0 wt. % of chain transfer agents;
  3) forming the third stage by emulsion polymerization of the product of the second stage polymerization and a reaction mixture comprising 98.5 to 100 wt. % of one or more monomers selected from the group consisting of alkyl (meth)acrylate monomers, styrenic monomers, and mixtures thereof, and 0 to 1.5 wt. % of one or more chain transfer agents; and
  4) forming the fourth stage by emulsion polymerization of the product of the third stage polymerization and a reaction mixture comprising one or more monoethylenically unsaturated ester monomers, a chain transfer agent in an amount of 0.1 to 10 wt. %, and a crosslinker in an amount of 0.1 to 10 wt. %, provided the amount of crosslinker in moles is less than the amount of chain transfer agent in moles.

DETAILED DESCRIPTION OF THE INVENTION

As used herein, the terms "a," "an," "the," "at least one," "one or more," and variations thereof are used interchangeably. The terms "comprises," "includes," "contains," and variations thereof do not have a limiting meaning where these terms appear in the description and claims. Thus, for example, a first mixed metal oxide catalyst that includes can be interpreted to mean that the mixture comprises at least one polymerization inhibitor.

As used herein, recitations of numerical ranges by endpoints includes all numbers subsumed in that rage (e.g., 1 to 5 includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.1 to 100, from 1 to 99.99, from 1.01 to 99.99, from 40 to 6, from 1 to 55, etc.

As used herein, the recitations of numerical ranges and/or numerical values, including such recitations in the claims, can be read to include the term "about." In such instances, the term "about" refers to numerical ranges and/or numerical values that are substantially the same as those recited herein.

Unless stated to the contrary, or implicit from the context, all parts and percentages are based on weight and all test methods are current as of the filing date of this application. Unless otherwise defined, the basis for weight percentages is the total weight of the element being defined, e.g., a first stage comprising from 95 to 99.9 wt. % of units derived from alkyl (meth)acrylate monomers means 95 to 99.9 wt. % based on the total weight of the first stage.

As used herein, "units derived from" means the residue of a monomer following polymerization of the monomer.

"Tg" as used herein, is the glass transition temperature, of a copolymer calculated with the Fox equation [Bulletin of the American Physical Society 1, 3 Page 123 (1956)] as follows:

$$\frac{1}{Tg} = \frac{w_1}{Tg_{(1)}} + \frac{w_2}{Tg_{(2)}}$$

For a copolymer, $w_1$ and $w_2$ refer to the weight fraction of the two comonomers, based on weight of monomers charged to the reaction vessel, and $Tg_{(1)}$ and $Tg_{(2)}$ refer to the glass transition temperatures of the two corresponding homopolymers in degrees Kelvin. For polymers containing three or more monomers, additional terms are added ($w_n/Tg_{(n)}$). The glass transition temperatures of homopolymers for the purposes of this invention are those reported in "Polymer Handbook", edited by J. Brandrup and E. H. Immergut, Interscience Publishers, 1966, unless that publication does not report the Tg of a particular homopolymer, in which case the Tg of the homopolymer is measured by differential scanning colorimetry (DSC).

Unless stated to the contrary, all molecular weights disclosed herein are weight average molecular weights. Weight average molecular weight (Mw) is determined by size exclusion chromatography using EasiCal PS-2® polystyrene standards supplied by Polymer Laboratories.

For purposes of United States patent practice, the contents of any referenced patent, patent application or publication are incorporated by referenced in their entirety or its equivalent U.S. version is so incorporated by reference) especially with respect to the disclosure of definitions (to the extent not inconsistent with any definitions specifically provided in this disclosure) and general knowledge in the art.

As used herein, the term "(meth)acrylate" means acrylate or methacrylate.

One aspect of the present invention relates to a multi-stage flexible acrylic resin comprising a branched polymer as described herein. The inventors have found that the viscosity of the multi-stage flexible acrylic resin without the branched polymer is too high to allow the resin to be used in certain applications, such as when there is a desire to extrude very thin films or in certain injection molding applications. Increasing processing temperature can cause the resin to degrade. Addition of low molecular weight linear additives can lower the viscosity (increase the melt flow index) but the inventors found that the resulting products in some instances showed crease whitening which can be indicative of phase separation in the mixture. Surprisingly, the inventors have found that including an outermost layer comprising branched polymers as disclosed lower the viscosity without showing undesirable crease whitening. In addition, multi-stage flexible acrylic resins having the branched polymers in an outermost layer can show improved tensile properties.

According to certain embodiments, the multi-stage flexible acrylic resin is a multi-stage sequential polymer composition comprising a first stage crosslinked acrylic polymer composition which forms a core, a second stage comprising one or more intermediate layer acrylic polymer compositions, a third stage comprising one or more outer layers comprising an acrylic polymer composition, and a fourth stage comprising a branched polymer.

The first, second, and third stages differ in one or more of the following respects: being derived from different acrylate monomers, degree of cross linking (the layers of the second and third stages may or may not be cross linked), and glass transition temperature. The acrylic polymer compositions are formed from reaction mixtures comprising one or more hydrocarbyl acrylates or hydrocarbyl methacrylates, optional cross linkers (except some cross linker is required for core), optional chain transfer agents.

According to certain embodiments, the multi-stage flexible acrylic resin comprises a first stage comprising a crosslinked core having a Tg in the range of −85 to −10° C.

The first stage may be the reaction product of one or more monomers selected from the group consisting of alkyl acrylates and alkyl methacrylates (i.e., alkyl (meth)acrylates) with one or more crosslinking monomers, graft-linking monomers or combinations thereof. According to certain embodiments the amount of units derived from alkyl (meth)acrylate monomers may range of 95 to 99.9 wt. % of the first stage and the amount of units derived from the cross-linking monomer and/or graft linking monomers may range from 0.1 to 5 wt. %.

The multi-stage flexible acrylic resin may comprise a second stage comprising one or more layers. Each of the layers of the second may comprise from up to 100 wt. % of units derived from a one or more monomers selected from the group consisting of alkyl (meth)acrylate monomers from 0 to 5 wt. % of units derived from a cross-linking monomer, a graft-linking monomer, or a combination thereof, and optionally comprise from 0 to 2.0 wt. % units derived from one or more chain transfer agents The second stage may have a compositional gradient between the one or more layers such that the Tg transitions between a lower Tg and an upper Tg over the width of the second stage. For example, the Tg of the one or more layers of the second stage may transition from a lower Tg of −30° C. to an upper Tg of 70° C. over the width of the second stage.

The multi-stage flexible acrylic resin further includes third stage. The third stage comprises one or more layers which may comprises from 98.5 to 100 wt. % units derived from one or more monomers selected from the group consisting of alkyl (meth)acrylate, styrenic monomers, and combinations thereof.

The one or more layers of the third stage may comprise from 0 to 1.5 wt. % units derived from one or more chain transfer agents.

The third stage of the multi-stage flexible acrylic resin may have a Tg of from 40° C. to 110° C.

The multi-stage flexible acrylic resin also includes a fourth stage. The fourth stage of the multi-stage flexible acrylic resin comprises one or more layers comprising a branched polymer which is a reaction product of reactants comprising one or more monoethylenically unsaturated ester monomers, a chain transfer agent in an amount of 0.1 to 10 wt. %, and a crosslinker in an amount of 0.1 to 10 wt. %, wherein the weight percentage is based on total amount of reactants, provided the amount of crosslinker in moles is less than the amount of chain transfer agent in moles.

According to at least one embodiment, the crosslinked core (i.e., the first stage) comprises greater than 95 to 99.9 wt. % of units derived from one or more monomers selected from the group consisting of alkyl (meth)acrylate monomers. All individual values and subranges from 95 to 99.9 wt. % are included herein and disclosed herein; for example, the amount of units derived from one or more alkyl (meth) acrylate monomers can be from a lower limit of 95, 95.5, 96, 96.5, 97, 975, 98, 98.5, 99, or 99.5 wt. % to an upper limit of 95.3, 95.8, 96.3, 96.9, 97.5, 98, 98.7, 99.4 or 99.9 wt. %. For example, the amount of units derived from one or more alkyl (meth)acrylate monomers may be in the range of from 95 to 99.9 wt. %, or in the alternative, the amount of units derived from one or more alkyl (meth)acrylate monomers may be in the range of from 95 to 97.5 wt. %, or in the alternative, amount of units derived from one or more alkyl (meth)acrylate monomers may be in the range of from 97.8 to 99.9 wt. %, or in the alternative, the amount of units derived from one or more alkyl (meth)acrylate monomers may be in the range of from 96.5 to 97.9 wt. %.

The crosslinked core may comprise from 0.1 to 5 wt. % of units derived from a cross-linking monomer, graft-linking monomer, or combination thereof. All individual values and subranges from 0.1 to 5 wt. % are included herein and disclosed herein; for example, the amount of units derived from cross-linking monomer, graft-linking monomer, or combination thereof can be from a lower limit of 0.1, 0.7, 1.2, 1.9, 2.6, 3.1, 3.7, 4.4, or 4.9 wt. %, to an upper limit of 0.2, 0.8, 1.4, 2.1, 2.7, 3.3, 3.8, 4.5 or 5 wt. %. For example, the amount of units derived from cross-linking monomer, graft-linking monomer, or combination thereof may be in the range of from 0.1 to 5 wt. %, or in the alternative, the amount of units derived from cross-linking monomer, graft-linking monomer, or combination thereof may be in the range of from 0.5 to 2.5 wt. %, or in the alternative, the amount of units derived from cross-linking monomer, graft-linking monomer, or combination thereof may be in the range of from 1.0 to 4.0 wt. %, or in the alternative, the amount of units derived from cross-linking monomer, graft-linking monomer, or combination thereof may be in the range of from 0.3 to 3.5 wt. %.

The crosslinked core has a Tg of from −85 to −10° C. All individual values and subranges from −70 to −10° C. are included herein and disclosed herein; for example, the Tg of the crosslinked core can be from a lower limit of −85, −80-70, −60, −50, −40, −30, −20, or −15° C. to an upper limit of −75, −65, −55, −45, −35, −25, −17 or −10° C. For example, the Tg of the crosslinked core may be in the range of from −85 to −10° C., or in the alternative, the Tg of the crosslinked core may be in the range of from −60 to −40° C., or in the alternative, the Tg of the crosslinked core may be in the range of from −70 to −50° C., or in the alternative, the Tg of the crosslinked core may be in the range of from −50 to −30° C.

The second stage comprises one or more layers. All individual values and subranges from one or more layers of the second stage is disclosed herein and included herein. For example, the second stage may comprise one, two, three, four, or five layers.

Each of the one or more layers of the second stage comprises up to 100 wt. % of units derived from a one or more monomers selected from the group consisting of alkyl (meth)acrylate monomers. All individual values and subranges up to 100 wt. % are included herein and disclosed herein; for example, the amount of units derived from one or more alkyl (meth)acrylate monomers can be from a lower limit of 88.5, 89.4, 90.7, 91.8, 92.6, 93.7, 94, 94.9, 95.5, 96, 97.4, 98.1, 99.3, 99.9 or 100 wt. %. For example, the amount of units derived from one or more alkyl (meth)acrylate monomers may be in the range of from 88.5 to 100 wt. %, or in the alternative, the amount of units derived from one or more alkyl (meth)acrylate monomers may be in the range of from 90.5 to 99.9 wt. %, or in the alternative, the amount of units derived from one or more alkyl (meth)acrylate monomers may be in the range of from 88.5 to 94.9 wt. %, or in the alternative, the amount of units derived from one or more alkyl (meth)acrylate monomers may be in the range of from 92.5 to 96 wt. %.

Each of the one or more layers of the second stage comprises from 0 to 5 wt. % of units derived from a cross-linking monomer, a graft-linking monomer, or a combination of two or more thereof. All individual values and subranges are disclosed herein and included herein; for example, the amount of units derived from a cross-linking monomer, a graft-linking monomer, or a combination thereof may be from a lower limit of 0, 0.5, 1, 1.5, 2, 2.5, 3, 3.5, 4, or 4.5 wt. % to an upper limit of 0.2, 0.7, 1.2, 1.7, 2.5, 2.7, 3.2, 3.7, 4.2, 4.7, or 5 wt. %. For example, the amount of units derived from a cross-linking monomer, a graft-linking monomer, or a combination of two or more thereof may be in the range of from 0 to 5 wt. %, or in the alternative, the amount of units derived from a cross-linking monomer, a graft-linking monomer, or a combination of two or more thereof may be in the range of from 0 to 2.5 wt. %, or in the alternative, the amount of units derived from a cross-linking monomer, a graft-linking monomer, or a combination of two or more thereof may be in the range of from 2.5 to 5 wt. %, or in the alternative, the amount of units derived from a cross-linking monomer, a graft-linking monomer, or a combination of two or more thereof may be in the range of from 2 to 4 wt. %.

Each of the one or more layers of the second stage optionally comprises from 0 to 2.0 wt. % units derived from one or more chain transfer agents. All individual values and subranges from 0 to 2.0 wt. % are included herein and disclosed herein; for example, the amount of units derived from one or more chain transfer agents can be from a lower limit of 0, 0.2, 0.4, 0.6, 0.8, 1.0, 1.2, 1.4, 1.6, 1.8, or 2.0 wt. % to an upper limit of 0.1, 0.3, 0.5, 0.7, 0.9, 1.1, 1.3, 1.7, or 1.9 wt. %. For example, the amount of units derived from one or more chain transfer agents may be in the range of from 0 to 2.0 wt. %, or in the alternative, the amount of units derived from one or more chain transfer agents may be in the range of from 0.75 to 2.0 wt. %, or in the alternative, the amount of units derived from one or more chain transfer agents may be in the range of from 0 to 0.75 wt. %, or in the alternative, the amount of units derived from one or more chain transfer agents may be in the range of from 0.5 to 1.0 wt. %.

According to at least one embodiment, there is a compositional gradient between the one or more layers of the second stage such that the Tg transitions from a lower Tg to an upper Tg over the width of the second stage, such as, for example, from a lower Tg of −30° C. to an upper Tg of 70° C. All individual values and subranges from −30° C. to 70° C. are included herein and disclosed herein; for example, the Tg can transition from a lower limit of −30, −20, −10, 0, 10, 20, 30, 40, 50, or 60° C. to an upper limit of −25, −15, −5, 5, 15, 45, or 70° C. For example, the Tg can transition over the range of from −30 to 70° C., or in the alternative, the Tg can transition over the range of from −10 to 30° C., or in the alternative, the Tg can transition over the range of from −30 to −15° C., or in the alternative, or in the alternative, the Tg can transition over the range of from −25 to 0° C., or in the alternative, the Tg can transition over the range of from 0 to 15° C., or in the alternative, the Tg can transition over the range of from −15 to 55° C., or in the alternative, the Tg can transition over the range of from 5 to 35° C.

In at least one embodiment, the third stage of the multi-stage flexible acrylic resin comprising one or more layers each of which comprises from 98.5 to 100 wt. % units derived from one or more monomers selected from the group consisting of alkyl (meth)acrylate, styrenic monomers, and combinations of two or more thereof. All individual values and subranges from 98.5 to 100 wt. % are included herein and disclosed herein; for example, the amount of units derived from one or more monomers selected from the group consisting of alkyl (meth)acrylate, styrenic monomers, and combinations of two or more thereof can be from a lower limit of 98.5, 98.7, 98.9, 99.1, 99.3, 99.5, 99.7, or 99.9 wt. % to an upper limit of 98.6, 98.8, 99, 99.2, 99.4, 99.6, 99.8, or 100 wt. %. For example, the amount of units derived from one or more monomers selected from the group consisting of alkyl (meth)acrylate, styrenic monomers, and combinations of two or more thereof may be in the range of from 98.5 to 100 wt. %, or in the alternative, the amount of units derived from one or more monomers selected from the group consisting of alkyl (meth)acrylate, styrenic monomers, and combinations of two or more thereof may be in the range of from 98.5 to 100 wt. %, or in the alternative, the amount of units derived from one or more monomers selected from the group consisting of alkyl (meth)acrylates, and styrenic monomers, and combinations of two or more thereof may be in the range of from 98.5 to 100 wt. %, or in the alternative, the amount of units derived from one or more monomers selected from the group consisting of alkyl (meth)acrylates, styrenic monomers, and combinations of two or more thereof may be in the range of from 98.5 to 100 wt. %, or in the alternative, the amount of units derived from one or more monomers selected from the group consisting of alkyl (meth)acrylate, styrenic monomers, and combinations of two or more thereof may be in the range of from 98.5 to 99.6 wt. %, or in the alternative, the amount of units derived from one or more monomers selected from the group consisting of alkyl (meth)acrylates, styrenic monomers, and combinations of two or more thereof may be in the range of from 96.5 to 100 wt. %.

According to at least one embodiment, each of the one or more layers of the third stage comprises from 0 to 1.5 wt. % units derived from one or more chain transfer agents. All individual values and subranges from 0 to 1.5 wt. % are included herein and disclosed herein; for example, the amount of units derived from one or more chain transfer agents can be from a lower limit of 0, 0.2, 0.4, 0.6, 0.8, 1, 1.2, or 1.4 wt. % to an upper limit of 0.1, 0.3, 0.5, 0.7, 0.9, 1.1, 1.3, or 1.5 wt. %. For example, the amount of units derived from one or more chain transfer agents may be in the range of from 0 to 1.5 wt. %, or in the alternative, the amount of units derived from one or more chain transfer agents may be in the range of from 0 to 0.75 wt. %, or in the alternative, the amount of units derived from one or more chain transfer agents may be in the range of from 0.75 to 1.5 wt. %, or in the alternative, the amount of units derived from one or more chain transfer agents may be in the range of from 0.3 to 1.2 wt. %.

Each of the one or more layers of the third stage has a Tg of from 40° C. to 110° C. All individual values and subranges from 50° C. to 110° C. are included herein and disclosed herein; for example, the Tg of the outermost layer can be from a lower limit of 40, 43, 45, 50, 60, 70, 80, 90, or 100° C. to an upper limit of 55, 65, 75, 85, 95, 105, or 110° C. For example, the Tg of the outermost layer may be in the range of from 40° C. to 110° C., or in the alternative, the Tg of the outermost layer may be in the range of from 45° C. to 80° C., or in the alternative, the Tg of the outermost layer may be in the range of from 75° C. to 110° C., or in the alternative, the Tg of the outermost layer may be in the range of from 65° C. to 95° C.

The alkyl of the alkyl (meth)acrylate used in any of one of the first, second, and third stages may be a linear or branched alkyl group with 1 to 12 carbon atoms. Exemplary monomers include Exemplary useful alkyl groups include butyl acrylate, ethyl hexyl acrylate, ethyl acrylate, methyl methacrylate, butyl methacrylate, and iso-octylacrylate.

Examples of cross-linking and/or graft-linking monomers useful in any of the first, second, and third stages may include, for example, butanediol diacrylate, butanediol dimethacrylate, ethylene glycol diacrylate, ethylene glycol dimethacrylate, divinyl benzene, diethylene glycol diacrylate, diethylene glycol dimethacrylate, diallyl maleate, allyl methacrylate, diallyl phthalate, triallyl phthalate, trimethylolpropane triacrylate, trimethylolpropane trimethacrylate blends thereof and combinations of two or more thereof.

According to at least one embodiment, the fourth stage of the multi-stage flexible acrylic resin comprising a branched polymer that is a reaction product of reactants comprising one or more monoethylenically unsaturated ester monomers, a chain transfer agent in an amount of 0.1 to 10 wt. %, and a crosslinker in an amount of 0.1 to 10 wt. % of a crosslinker, wherein wt. % is based on total amount of reactants. The branched polymer is not cross-linked. To avoid cross-linking, the amount of cross-linker is not greater than the amount of chain transfer agent. Thus, according to certain embodiment the moles of cross-linker is no more than the moles of chain transfer agent. According to certain embodiments the weight percent of crosslinker is less than the weight percent of chain transfer agent.

Suitable monoethylenically unsaturated ester monomers useful in making the branched polymer of the fourth stage according to certain embodiments can have the structure R'—C(O)O—R where R is a hydrocarbyl group (e.g., alkyl group or aryl group) and R' is a monoethylenically unsaturated aliphatic group having at least 2 or 3 carbon atoms. According to certain embodiments R is an alkyl group of at least 1 or 2 or 3 carbon atoms. According to certain embodiments R is an alkyl group having no more than 12 or 10 or 8 or 6 or 5 carbon atoms. According to certain embodiments R is an aryl group of 6 to 12 carbon atoms. According to certain embodiments R' has no more than 6 carbon atoms. Examples of suitable monomers useful in making the branched polymer of the fourth stage include butyl acrylate, ethyl hexyl acrylate, ethyl acrylate, methyl methacrylate, butyl methacrylate, cyclohexyl (meth)acrylate, cyclopentyl methacrylate, tetrahydrofurfyl methacrylate, and benzyl (meth)acrylate. Combinations of two or more such monoethylenically unsaturated ester monomer may be used. For example, a combination of methyl methacrylate and butyl methacrylate can be used. For example, the amount of methyl methacrylate can be at least 20, 30, 40, 50, 60, 70 or 80 wt. % of the reactants and can be for example less than 99.8, 99, 98, 97, 96, 95, 90, 85 wt. % of the reactants. A second monoethylenically unsaturated ester monomer (e.g., butyl acrylate) can be 0 or greater than 0, 1, 2, 3, 4, 5 wt. % of the reactants and less than 60, 50, 40, 30, 20, or 10 wt. % of the reactants. In certain embodiments, additional monoethylenically unsaturated ester monomers may be used. The combination of the second and additional monoethylenically unsaturated monomer(s) taken together in such embodiments is greater than 0, 1, 2, 3, 4, 5 wt. % of the reactants and less than 60, 50, 40, 30, 20, or 10 wt. % of the reactants.

According to certain embodiments one or more additional monounsaturated addition-polymerizable (e.g., monoethylenically unsaturated) monomers may be included in the branched polymer of the fourth stage. For example, styrene or acrylonitrile could be added. The amount of such additional is preferable less than 10 or 5 wt. % based on weight of the reactants.

The reactants for forming the branched polymer further comprise a chain transfer agent (CTA). The chain transfer agent may be any compound known or found to be useful as a chain transfer agent in polymerization of acrylate or methacrylate monomers. For example, thiol chain transfer agents can be used. Examples of such thiol CTAs include monofunctional and polyfunctional thiols. Monofunctional thiols include, but are not limited to, propyl mercaptan, butyl mercaptan, hexyl mercaptan, octyl mercaptan, dodecyl mercaptan, thioglycolic acid, mercaptopropionic acid, alkyl thioglycollates e.g. 2-ethyl hexyl thioglycollate or octylthioglycollate, mercaptoethanol, mercaptoundecanoic acid, thiolactic acid, thiobutyric acid. Polyfunctional thiols include trifunctional compounds such as trimethylol propane tris(3-mercaptopropionate), tetrafunctional compounds such as pentaerythritol tetra(3-mercaptopropionate), pentaerythritol tetrathioglycollate, pentaerythritol tetrathiolactate, pentaerythritol tetrathiobutyrate; hexafunctional compounds such as dipentaerythritol hexa(3-mercaptopropionate), dipentaerythritol hexathioglycollate; octafunctional thiols such as tripentaerythritol octa(3-mercaptopropionate), tripentaerythritol octathioglycollate. The use of polyfunctional thiols is a useful way to increase the degree of branching in the polymer. Optionally, the chain transfer agent may comprise a mixture of more than one type of compound. According to one embodiment, the CTA is

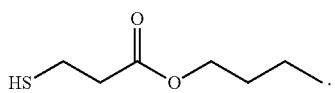

butyl 3-mercaptopropionate (BMP)

Alternative chain transfer agents may be any species known to reduce molecular weight in the conventional free-radical polymerization of vinyl monomers. Examples include sulphides, disulphides, halogen-containing species. Also, catalytic chain transfer agents such as cobalt complexes, e.g. cobalt (II) chelates such as cobalt porphyrin compounds are useful chain transfer agents for the invention. Suitable cobalt chelates are known in the art and are described in WO 98/04603. A particularly suitable compound is bis(borondifluorodimethylglyoximate) cobaltate (II) also known as CoBF. Catalytic chain transfer agents may be used in relatively low concentrations compared to conventional thiol chain transfer agents, e.g. <0.5 wt. %, preferably <0.1 wt. % (based on monofunctional monomer), since they are generally highly effective at low concentrations. We have surprisingly found that catalytic chain transfer compounds based on cobalt complexes may be very effectively used at concentrations of less than 0.05 wt. % (500 ppmw), e.g. 0.0001-0.01 wt. % (1-100 ppmw) based on monofunctional monomer in the polymerization process of the present invention to give soluble branched polymers.

The amount of chain transfer agent used to form the branched polymer of the fourth stage is at least 0.1 or 0.5 or 1 wt. % based on total weight of the reactants. According to some embodiments the amount of chain transfer agent is no more than 10 or 8 or 6 or 5 wt. % based on total weight of the reactants.

The reactants for forming the branched polymer further comprise a cross-linker. Inclusion of the cross-linker provides the branching. However, the amount of cross-linker must be controlled so that the polymer does not cross-link. According to an embodiment the amount of crosslinker is no more than the amount of chain transfer agent. According to an embodiment, the amount of crosslinker is less than the amount of chain transfer agent. According to an embodiment the weight percent of crosslinker is less than the weight percent of chain transfer agent. According to an embodiment the weight ratio of chain transfer agent to cross linker is in the range of 1:1 or 1.5:1 to 10:1. According to an embodiment, the mole percent of crosslinker is less than the mole percent of chain transfer agent. According to an embodiment the mole ratio of chain transfer agent to cross linker is at least 1.2:1 or 1.4:1 or 1.5:1 or 1.7:1 or 2:1 or 4:1. According to an embodiment the mole ratio of chain transfer agent to cross linker is less than 20:1 or 15:1 or 10:1.

The cross linker used for forming the branched polymer may be any polyfunctional unsaturated monomer, i.e., any monomer having two or more unsaturated groups available for addition polymerization. Examples of suitable bifunctional monomers include: ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl (meth)acrylate, divinyl benzene and derivatives thereof. Trifunctional examples include: tripropylene glycol tri(meth)acrylate, trimethylol propane tri(meth)acrylate, pentaerythritol tri(meth)acrylate. Tetrafunctional monomers such as pentaerythritol tetra(meth)acrylate and hexafunctional monomers, e.g. dipentaerythritol hexa(meth) acrylate may also be used. Optionally, the polyfunctional monomer may comprise a mixture of more than one polyfunctional compound. According to one embodiment the crosslinker is

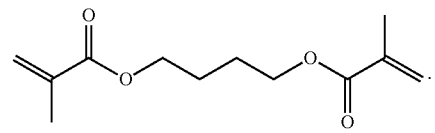

1,4-butanediol dimethacrylate (BGDMA)

The amount of crosslinker according to some embodiments is at least 0.1 or 0.5 or 1 wt. % based on total weight of the reactants used to form the branched polymer. According to some embodiments the amount of cross linker is no more than 10 or 8 or 6 or 5 wt. % based on total weight of the reactants.

According to certain embodiments the cross linker is BGDMA and the chain transfer agent is BMA. According to an embodiment the acrylate monomer (e.g., methyl methacrylate) is present in amounts of from 90 to 99 wt. %, the amount of BGDMA is in the range of 1 or 2 to 4 or 3 wt. % and the amount of BMA is in the range of 1 or 2 or 3 to 7 or 6 wt. % based on total weight of acrylate monomer, BGDMA and BMA.

According to certain embodiments the total amount of the first, second, and third stages in the multi-stage flexible acrylic resin comprises at least 10, 20, 30, 40, 50, 60, 70, 75, 80, 85, or 90 wt. % based on total weight of the multi-stage flexible acrylic resin. The total amount of the first, second, and third stages in the multi-stage flexible acrylic resin may comprise less than 90, 85, 80, 75, 70, 60, 50, or 40 wt. % based on total weight of the multi-stage flexible acrylic resin. The fourth stage may comprise at least 10, 15, 20, 25, 30, 40, 50, 60, 70, 80, or 90 wt. % based on total weight of the multi-stage flexible acrylic resin. The fourth stage may comprise less than 90, 80, 70, 60, 50, 40, 30, 25, 20, 15, or 10 wt. % based on total weight of the multi-stage flexible acrylic resin.

According to at least one embodiment, the ratio of the amount of the fourth stage in the multi-stage flexible acrylic resin relative to the total amount of the first stage, second stage, and third stage may be varied to control the melt flow index (viscosity) of the resin. The inventors have found that a multi-stage acrylic resin without the fourth stage has a viscosity that may be too high for use in certain applications, such as the extrusion of very thin films or in certain injection molding applications. The inventors have found that the presence of the branched polymer in the fourth stage may increase the melt flow index (lower the viscosity) of the multi-stage flexible acrylic resin.

According to at least one embodiment, the weight ratio of the fourth stage relative to the combined weight of the first, second, and third stages ranges from 5:95 to 50:50. Preferably, the weight ratio of the fourth stage relative to the combined weight of the first, second, and third stages ranges from 10:90 to 40:60, and more preferably from 15:85 to 30:70.

The multi-stage flexible acrylic resin preferably has a melt flow index according to ASTM D1238 of at least 30, 40, 50, or 60 g/10 min, 220° C., 10 kg. According to certain embodiments, the melt flow index is less than 100 or 90 g/10 min, 220° C., 10 kg.

According to certain embodiments the multi-stage flexible acrylic resin is non-hazy. For example, a haze as measured by light transmission is less than 1% as measured according to ASTMD1003 using a suitable instrument, e.g. BYKHazeGuard Plus.

Another aspect of the present invention relates to a process for forming the multi-stage flexible acrylic resin. According to at least one embodiment, the multi-stage flexible acrylic resin is formed by emulsion polymerization, wherein each stage of the multi-stage flexible acrylic resin is formed sequentially. In at least one embodiment, the multi-stage flexible acrylic resin is formed in a single reactor.

In certain embodiments, a first stage is formed by emulsion polymerization of a reaction mixture comprising 95 to 99.9 wt. % of one or more monomers selected from the group consisting of alkyl (meth)acrylate monomers and 0.1 to 5 wt. % of one or more monomers selected from crosslinking monomers, graft-linking monomers, and mixtures thereof.

The second stage is formed by emulsion polymerization in the presence of the first stage and a reaction mixture comprising up to 100 wt. % of monomers selected from the group consisting of alkyl (meth)acrylate monomers. The reaction mixture for the second stage may comprise from 0 to 5 wt. % of one or more monomers selected from crosslinking monomers, graft-linking monomers, and mixtures thereof, and from 0 to 2 wt. % of chain transfer agents. The emulsion polymerization may be repeated to form more than one layer for the second stage. The reaction mixture used to form additional layers may be the same or different, and may be formed, by example, by adding additional monomers to the reaction mixture to change the composition of the reaction mixture. In this manner, the layers of the second stage may be different from one another. In this manner, a product comprising the layer(s) of the second stage forming a shell around the crosslinked core of the first stage.

The third stage is formed by emulsion polymerization in the presence of the product of the second stage polymerization reaction, i.e., the first stage and second stage, and a reaction mixture comprising monomers to be incorporated into the third stage. The reaction mixture for forming the third stage may comprise 98.5 to 100 wt. % of one or more monomers selected from the group consisting of alkyl (meth)acrylate monomers, styrenic monomers, and mixtures thereof. The reaction mixture for the third stage polymerization reaction may also comprise 0 to 1.5 wt. % of one or more chain transfer agents. The product of the third stage polymerization comprises the first stage, the second stage, and the third stage.

The fourth stage is formed by emulsion polymerization in the presence of the product from the third stage polymerization, i.e., the first stage, second stage, and third stage, and a reaction mixture comprising monomers for the fourth stage. The reaction mixture for the fourth stage polymerization reaction may comprise one or more monoethylenically unsaturated ester monomers, a chain transfer agent in an amount of 0.1 to 10 wt. %, and a crosslinker in an amount of 0.1 to 10 wt. %, wherein the weight percentage is based on the total amount of monoethylenically unsaturated ester monomers, chain transfer agent, and crosslinker in the fourth stage polymerization reaction mixture, provided the amount of crosslinker in moles is less than the amount of chain transfer agent in moles. The product of the fourth stage polymerization reaction is a multi-stage flexible acrylic resin comprising the first stage, the second stage, the third stage, and the fourth stage.

A surfactant or emulsifier may be used in any of the process steps. Examples of emulsifiers include non-ionic, anionic and cationic emulsifiers.

Suitable nonionic emulsifiers are araliphatic or aliphatic nonionic emulsifiers, examples being ethoxylated mono-, di-, and trialkylphenols (degree of ethoxylation: 3 to 50, alkyl radical: $C_4$-$C_{10}$), ethoxylates of long-chain alcohols (degree of ethoxylation: 3 to 100, alkyl radical: $C_8$-$C_{36}$), and also polyethylene oxide/polypropylene oxide homopolymers and copolymers. These may comprise the alkylene oxide units copolymerized in random distribution or in the form of blocks. Highly suitable are, for example, ethylene oxide/propylene oxide block copolymers. Preference is given to using ethoxylates of long-chain alkanols (alkyl radical $C_1$-$C_{30}$, average degree of ethoxylation 5 to 100) and, among these, particular preference to those having a linear $C_{12}$-$C_{20}$ alkyl radical and an average degree of ethoxylation of 10 to 50, and also ethoxylated monoalkylphenols.

Suitable anionic emulsifiers are, for example, alkali metal and ammonium salts of alkyl sulfates (alkyl radical: $C_8$-$C_{22}$), of sulfuric monoesters with ethoxylated alkanols (degree of ethoxylation: 2 to 50, alkyl radical: $C_{12}$-$C_{18}$) and with ethoxylated alkylphenols (degree of ethoxylation: 3 to 50, alkyl radical: $C_4$-$C_9$), of alkylsulfonic acids (alkyl radical: $C_{12}$-$C_{18}$) and of alkylarylsulfonic acids (alkyl radical: $C_9$-$C_{15}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208. Also, suitable as anionic emulsifiers include bis(phenylsulfonic acid) ethers and their alkali metal or ammonium salts which carry a $C_4$-$C_{24}$ alkyl group on one or both aromatic rings. These compounds are common knowledge, from U.S. Pat. No. 4,269,749, for example, and are available commercially, in the form for example of Dowfax™ 2A1 (Dow Chemical Company).

Suitable cationic emulsifiers are preferably quaternary ammonium halides, e.g., trimethylcetylammonium chloride, methyltrioctylammonium chloride, benzyltriethylammonium chloride or quaternary compounds of $N-C_6-C_{20}$-alkylpyridines, -morpholines or -imidazoles, e.g., N-laurylpyridinium chloride.

The amount of emulsifier (or surfactant) can be at least 0.01 or 0.1 wt. % to 10 or 5 wt. %, based on the amount of monomers to be polymerized in each of the emulsion polymerization steps.

Initiators may be used. Examples of initiators include may be initiated by any suitable method of generating free-radicals such as by thermally induced decomposition of a thermal initiator such as an azo compound, peroxide or peroxyester. Therefore, the polymerization mixture also preferably contains a polymerization initiator which may be any of those known and conventionally used in free-radical polymerization reactions. Examples of azo initiators include azobis(isobutyronitrile) (AIBN), azobis(2-methylbutyronitrile), azobis(2,4-dimethylvaleronitrile), azobis(4-cyanovaleric acid). Examples of peroxide and peroxy initiators include hydrogen peroxide, sodium peroxide, potassium peroxide, t-butyl hydroperoxide, cumene hydroperoxide, dilauroyl peroxide, tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate. Examples of additional initiators include ammonium and/or alkali metal persulfates, sodium perborate, perphosphoric acid and salts thereof, potassium permanganate, and ammonium or alkali metal salts of peroxydisulfuric acid, examples being alkali metal or ammonium peroxydisulfates, diacetyl peroxide, dibenzoyl peroxide, succinyl peroxide, di-tert-butyl peroxide, tert-butyl perbenzoate, tert-butyl perpivalate, tort-butyl peroxy-2-ethylhexanoate, tert-butyl permaleinate, cumene hydroperoxide, diisopropyl peroxydicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis(2-amidino-propane)dihydrochloride or 2,2'-azobis(2-methylbutyronitrile). Also suitable are mixtures of these initiators. As initiators it is also possible to use reduction/oxidation (i.e., redox) initiator systems. The redox initiator systems are composed of at least one, usually inorganic, reducing agent and one organic or inorganic oxidizing agent. The oxidizing component comprises, for example, the emulsion polymerization initiators already specified above. The reducing component comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite or reducing agents such as hydroxymethanesulfinic acid and salts thereof, or ascorbic acid. The redox initiator systems can be used along with soluble metal compounds whose metallic component is able to occur in a plurality of valence states. Typical redox initiator systems are, for example, ascorbic acid/iron(II)sulfate/sodium peroxodisulfate, tert-butyl hydroperoxide/sodium disulfite, tert-butyl hydroperoxide/Na hydroxymethanesulfinate. The individual components, the reducing component for example, may also be mixtures, an example being a mixture of the sodium salt of hydroxymethanesulfinic acid and sodium disulfite.

The amount of initiator is generally at least 0.01 or 0.05 or 0.01 wt. % to 10 or 5 or 3 wt. % based on all of the monomers to be polymerized.

The branched polymers in the fourth stage are not cross-linked. For example, this can be demonstrated by evaluating the solubility of the polymers in a solvent such as tetrahydrofuran. A cross-linked polymer will not be soluble.

The branched polymers according to certain embodiments can be characterized by a polymer branching ratio, g', of less than 1, 0.95, 0.9, or 0.8. According to some embodiments g' is at least 0.5 or 0.6 or 0.7. The polymer branching ratio (g') is calculated by comparing measured the intrinsic viscosity of the branched polymer ($[\eta]_{branched}$) at each elution volume increment to the intrinsic viscosity of the linear polymer ($[\eta]_{linear}$) with the same molecular weight (M) (Eq. 1) in gel permeation chromatography (GPC) analysis. For a linear polymer, g' value equals to 1 and, for a branched polymer, g' is smaller than 1.

$$g' = \left(\frac{[\eta]_{branched}}{[\eta]_{linear}}\right)_M \quad \text{(Eq. 1)}$$

Molecular Weight Analysis: The polymer absolute molecular weights ($M_w$, $M_n$), PMMA-relative molecular weights ($M_{w\_PMMA}$, $M_{n\_PMMA}$), intrinsic viscosity ($[\eta]_w$, $[\eta]_n$), and branching ratio (g') can be measured by gel permeation chromatography with online multi-angle light scattering (MALS) detector, viscometer (VS), and differential refractive index (dRI) detector. For example, the GPC instrument setup can include an Agilent 1200 series HPLC system (degasser, pump, autosampler and column oven), a Wyatt HELEOS II MALS detector, a Wyatt ViscoStar II viscometer, and a Wyatt T-rEX dRI detector. The polymer separation can be carried out on a column set e.g. having two PLgel 10 μm PLgel mixed B LS columns (7.5×300 mm) using tetrahydrofuran (THF) as the mobile phase at a flow rate of 1 mL/min. Column oven temperature is set at 30° C. A set of 10 points PMMA standards (Agilent EasiCal PM-1) is used to calibrate the GPC columns and provide the PMMA-relative molecular weight. The absolute molecular weights are obtained from the MALS detection using Zimm formalism and the intrinsic viscosity data are obtained from the viscometer. High molecular weight fractions data (PMMA-relative molecular weight larger than 6500 Da) are used to calculate average g' values. For consistency of g' calculation, a linear PMMA model from Mark-Houwink equation (Eq. 2, where K=0.03044 mL/g and α=0.615) is used to obtain the ($[\eta]_{linear}$) in Eq. 1 using the M data from MALS detection.

$$[\eta] = KM^\alpha \quad \text{(Eq. 2)}$$

The weight average molecular weight, $M_w$, as measured by GPC of the branched polymer in the fourth stage is according to certain embodiments in the range of at least 8000 or 10,000 or 15,000 or 20,000 g/mol. According to certain embodiments weight average molecular weight is no more than 100,000 or 80,000 g/mol. The number average molecular weight, $M_n$, of the branched polymer as measured by GPC according to certain embodiments is at least 3000 or 4000 or 5000 g/mol. According to certain embodiments the number average molecular weight is no more than 50,000 or 40,000 or 30,000, or 20,000 g/mol.

According to certain embodiments the branched structure is a dendritic structure.

Another aspect of the present invention relates to compositions incorporating the multi-stage flexible acrylic resin.

According to at least one embodiment, the multi-stage flexible acrylic resin may be blended with another polymer to form a composition. Examples of such polymers include acrylate polymers, such as poly(methylmethacrylate), or other polymers such as polyvinylchloride.

In other embodiments, the multi-stage flexible acrylic resin may be blended with another multi-stage resin. For example, a multi-stage flexible acrylic resin according to embodiments disclosed herein may be blended with a multi-stage acrylic resin that does not comprise a branched polymer, e.g., a multi-stage acrylic resin comprising three stages corresponding to the first stage, the second stage, and the third stage in the multi-component flexible acrylic resins disclosed herein. The ratio of the multi-stage acrylic resins in such a blend could be adjusted, for example, to control the amount of branched polymer contained within the blend and to tune the properties of the polymer blend, such as, for example, the melt flow index.

The compositions may further comprise additional additives as are desired for the final product. Examples of such additives include UV light stabilizers and antioxidants. According to certain embodiments that additives are selected such that the composition remains transparent. Examples of UV light stabilizers include benzophenones, benzotriazoles, triazines, benzoxazinones, hindered amine light stabilizer (HALS) and hindered benzoates. Commercially available UV and light stabilizers are exemplified by Cyasorb Light Absorbers, and Light Stabilizers, and Cyasorb Cynergy Solutions from Solvay, TINUVIN FROM BASF, LowLite from Chemtura, OnCap from PolyOne, and Light Stabilizer 210 from E. I. du Pont de Nemours and Company of Delaware, U.S.A. examples thereof include phenolic antioxidants, and combinations of phenolic antioxidants with phosphites, thioethers or organic sulfides. Phenolic antioxidants include fully sterically hindered phenols and partially hindered phenols; and sterically hindered amines such as tetramethyl-piperidine derivatives. Suitable phenolic antioxidants include vitamin E and IRGANOX™ 1010 from BASF. IRGANOX™ 1010 comprises pentaerythritol tetrakis(3-(3,5-di-t-butyl-4-hydroxyphenyl)propionate). Additional examples of antioxidants are acetyl cysteine, arbutin, ascorbic acid, ascorbic acid polypeptide, ascorbyl dipalmitate, ascorbyl methylsilanol pectinate, ascorbyl palmitate, ascorbyl stearate, BHA, p-hydroxyanisole, BHT, t-butyl hydroquinone, caffeic acid, *Camellia sinensis* oil, chitosan ascorbate, chitosan glycolate, chitosan salicylate, chlorogenic acids, cysteine, cysteine HCl, decyl mercaptomethylimidazole, erythorbic acid, diamylhydroquinone, di-t-butylhydroquinone, dicetyl thiodipropionate, dicyclopentadiene/t-butylcresol copolymer, digalloyl trioleate, dilauryl thiodipropionate, dimyristyl thiodipropionate, dioleyl tocopheryl methylsilanol, isoquercitrin, diosmine, disodium ascorbyl sulfate, disodium rutinyl disulfate, distearyl thiodipropionate, ditridecyl thiodipropionate, dodecyl gallate, ethyl ferulate, ferulic acid, hydroquinone, hydroxylamine HCl, hydroxylamine sulfate, isooctyl thioglycolate, kojic acid, madecassicoside, magnesium ascorbate, magnesium ascorbyl phosphate, melatonin, methoxy-PEG-7 rutinyl succinate, methylene di-t-butylcresol, methylsilanol ascorbate, nordihydroguaiaretic acid, octyl gallate, phenylthioglycolic acid, phloroglucinol, potassium ascorbyl tocopheryl phosphate, thiodiglycolamide, potassium sulfite, propyl gallate, rosmarinic acid, rutin, sodium ascorbate, sodium ascorbyl/cholesteryl phosphate, sodium bisulfite, sodium erythorbate, sodium metabisulfide, sodium sulfite, sodium thioglycolate, sorbityl furfural, tea tree (*Melaleuca aftemifolia*) oil, tocopheryl acetate, tetrahexyldecyl ascorbate, tetrahydrodiferuloylmethane, tocopheryl linoleate/oleate, thiodiglycol, tocopheryl succinate, thiodiglycolic acid, thioglycolic acid, thiolactic acid, thiosalicylic acid, thiotaurine, retinol, tocophereth-5, tocophereth-10, tocophereth-12, tocophereth-18, tocophereth-50, tocopherol, tocophersolan, tocopheryl linoleate, tocopheryl nicotinate, tocoquinone, o-tolyl biguanide, tris(nonylphenyl) phosphite, ubiquinone, zinc dibutyldithiocarbamate, and mixtures thereof. According to certain embodiments the total amount of additives used (if any) is less than 10 or 5 or 3 wt. % based on total weight of the composition.

The composition preferably has melt flow index according to ASTM D1238 of at least 30, 40, 50, or 60 g/10 min, 220° C., 10 kg. According to certain embodiments, the melt flow index is less than 100 or 90 g/10 min, 220° C., 10 kg.

According to certain embodiments the composition is non-hazy. For example, a haze as measured by light transmission is less than 1% as measured according to ASTMD1003 using suitable instrument, e.g. BYKHaze-Guard Plus.

The multi-stage flexible acrylic resin, either alone or incorporated within a composition, is useful in extruding and injection molding applications due to the favorable melt flow index.

According to an embodiment the multi-stage flexible acrylic resin or composition thereof may be extruded as a thin film. The film can have a thickness of 150 or 125 or 100 microns or less. According to certain embodiments the thickness is at least 50 microns. According to an embodiment the multi-stage flexible acrylic resin or composition thereof may be coextruded as a layer in a multi-layer film. The layer can have a thickness of 150 or 125 or 100 microns or less. According to certain embodiments the layer has a thickness of at least 10, 20 30 or 50 microns. The film is transparent. The film does not show crease whitening.

Examples

Multi-stage flexible acrylic resins were formed by conventional emulsion polymerization. A three-stage flexible acrylic resin was prepared for comparative purposes, as well as for use in compositions according to embodiment of the present invention. Four-stage flexible acrylic resins in accordance with embodiments of the present invention were prepared by conducting a fourth stage emulsion polymerization reaction using the product of the three-stage polymerization reaction in the same reactor.

Three-Stage Flexible Acrylic Resin

A three-stage flexible acrylic resin (3-FAR) was prepared by conventional emulsion polymerization as disclosed in U.S. Pat. No. 10,040,915.

Four-Stage Flexible Acrylic Resins

Four-stage flexible acrylic resins in accordance with embodiments of the present invention were made by conventional emulsion polymerization using the three-stage flexible acrylic resin (3-FAR) as prepared above with a fourth stage reaction mixture comprising MMA and BA monomer, a chain transfer agent (CTA) comprising butyl 3-mercapto propionate (BMP), and a crosslinker (XL) comprising 1,4-butanediol dimethacrylate (BGDMA). The fourth stage comprises 87.5 wt. % MMA, 5 wt. % BA, 5 wt. % BMP, and 2.5 wt. % BGDMA. The composition of the fourth stage is the same in each of the Examples below.

Melt Flow Index

The melt-flow index (MFI) of the three-stage flexible acrylic resin (3-FAR) was compared to the melt flow index of a four-stage flexible acrylic resin in accordance with an embodiment of the present invention. The MFI was measured according to ASTM D1238. As seen in Table 1 below, the presence of the fourth stage significantly increases the MFI of the multi-stage flexible acrylic resin.

TABLE 1

| Example | Stages 1-3 (wt. %) | Stage 4 (wt. %) | MFI* |
|---|---|---|---|
| 3-FAR | 100% | 0% | 9 |
| Example 1 | 85% | 15% | 43 |
| Example 2 | 85% | 15% | 57 |

*MFI is expressed in units of g/10 mm, 220° C., 10 kg.

Blended Compositions

Compositions containing multi-stage flexible acrylic resins in accordance with embodiments of the present invention were prepared by blending four-stage flexible acrylic resins with the three-stage flexible acrylic resin (3-FAR) described above. The ingredients that make up the compositions may be mixed together by any known mixing process and conventional equipment such as polymer compounding equipment or powder mixers.

The fourth stage of each of the four-stage flexible acrylic resins had the same composition as described above, i.e., 87.5 wt. % MMA, 5 wt. % BA, 5 wt. % BMP, and 2.5 wt. % BGDMA, and the first, second, and third stages of the four-stage flexible acrylic resins had the same composition as the three stages of the 3-FAR. The ratio of the weight of the fourth stage to the total weight of the first, second, and third stages was varied. The four-stage flexible acrylic resins were isolated and blended with the 3-FAR. The samples were then milled at 185° C. using a lab two-roll mill for 5 minutes, and clear films were formed and tested for MFI.

TABLE 2

| | Weight Percentage | | | | |
|---|---|---|---|---|---|
| | Four-Stage Flexible Acrylic Resin | | Powder Blend for Milling | | |
| | Total Wt. % of | | Four-Stage Flexible Acrylic | | Overall Wt. % of Stage 4 in |
| Example | Stages 1-3 | Stage 4 | Resin | 3-FAR | Blend | MFI* |
| Example 3 | 70% | 30% | 50% | 50% | 15% | 84 |
| Example 4 | 25% | 75% | 20% | 80% | 15% | 84 |
| Example 5 | 25% | 75% | 11.3% | 88.8% | 8.7% | 47 |
| Example 6 | 25% | 75% | 10% | 90% | 7.5% | 51 |

*MFI is expressed in units of g/10 min, 220° C., 10 kg.

What is claimed is:

1. A multi-stage flexible acrylic resin comprising:
   a) a first stage comprising a crosslinked core having a Tg ranging from −85 to −10° C.;
   b) a second stage comprising one or more layers comprising from 88.5 to 100 wt. % of units derived from one or more monomers selected from the group consisting of alkyl (meth)acrylate monomers, from 0 to 5 wt. % of units derived from a cross-linking monomer, a graft-linking monomer, or a combination of two or more thereof, optionally from 0 to 2 wt. % units of one or more chain transfer agents, wherein there is a compositional gradient between the one or more layers of the second stage such that the Tg transitions between a lower Tg and an upper Tg, wherein the lower Tg is at least 0° C. and the upper Tg is 70° C. or less over the width of the second stage;
   c) a third stage comprising one or more layers comprising from 98.5 to 100 wt. % units derived from one or more monomers selected from the group consisting of alkyl (meth)acrylate, styrenic monomers, and combinations of two or more thereof, and from 0 to 1.5 wt. % units derived from one or more chain transfer agents, wherein the third stage has a Tg ranging from 40° C. to 110° C.; and
   d) a fourth stage comprising one or more layers comprising a branched polymer which is a reaction product of reactants comprising one or more monoethylenically unsaturated ester monomers, a chain transfer agent in an amount of 0.1 to 10 wt. %, and a crosslinker in an amount of 0.1 to 10 wt. %, wherein wt. % is based on total amount of reactants, provided the amount of crosslinker in moles is less than the amount of chain transfer agent in moles.

2. The multi-stage flexible acrylic resin of claim 1 wherein the branched polymer in the fourth stage is not cross-linked.

3. The multi-stage flexible acrylic resin of claim 1 wherein the one or more monoethylenically unsaturated ester monomers has the structure R'—C(O)O—R, wherein R is a hydrocarbyl group of 1 to 12 carbon atoms and R' is a monoethylenically unsaturated aliphatic group having at least 2 or 3 carbon atoms.

4. The multi-stage flexible acrylic resin of claim 1 wherein the chain transfer agent in the fourth stage is selected from the group consisting of propyl mercaptan, butyl mercaptan, hexyl mercaptan, octyl mercaptan, dodecyl mercaptan, thioglycolic acid, mercaptopropionic acid, alkyl thioglycollates, mercaptoethanol, mercaptoundecanoic acid, thiolactic acid, thiobutyric acid, trimethylol propane tris(3-mercaptopropionate), pentaerythritol tetra(3-mercaptopropionate), pentaerythritol tetrathioglycollate, pentaerythritol tetrathiolactate, pentaerythritol tetrathiobutyrate; dipentaerythritol hexa(3-mercaptopropionate), dipentaerythritol hexathioglycollate; tripentaerythritol octa(3-mercaptopropionate), tripentaerythritol octathioglycollate, butyl 3-mercaptopropioante and combinations of two or more thereof.

5. The multi-stage flexible acrylic resin of claim 1 wherein the cross-linker in the fourth stage is selected from the group consisting of ethylene glycol di(meth)acrylate, hexanediol di(meth)acrylate, tripropylene glycol di(meth) acrylate, butanediol di(meth)acrylate, neopentyl glycol di(meth)acrylate, diethylene glycol di(meth)acrylate, triethylene glycol di(meth)acrylate, dipropylene glycol di(meth) acrylate, allyl (meth)acrylate, divinyl benzene and derivatives thereof, tripropylene glycol tri(meth)acrylate, trimethylol propane tri(meth)acrylate, pentaerythritol tri (meth)acrylate, pentaerythritol tetra(meth)acrylate dipentaerythritol hexa(meth)acrylate, 1,4 butanediol dimethacrylate, and combinations of two or more thereof.

6. The multi-stage flexible acrylic resin of claim 1 wherein the amount of cross-linker in the fourth stage is from 0.5 to 4 wt. %.

7. The multi-stage flexible acrylic resin of claim 1 wherein the amount of chain transfer agent in the fourth stage is from 1 to 5 wt. %.

8. The multi-stage flexible acrylic resin of claim 1 wherein the branched polymer in the fourth stage is characterized by a g' of no more than 0.9.

9. The multi-stage flexible acrylic resin of claim 1, wherein the fourth stage comprises 1 to 75 wt. % based on total weight of the multi-stage flexible acrylic resin.

10. The multi-stage flexible acrylic resin of claim 9, wherein the fourth stage comprises 5 to 50 wt. % based on total weight of the multi-stage flexible acrylic resin.

11. The multi-stage flexible acrylic resin of claim 1 having a melt flow index of at least than 40 g/10 minutes, 220° C., 10 kg.

12. A process for producing the multi-stage flexible acrylic resin according to claim 1, comprising:
1) Forming the first stage by emulsion polymerization of a first stage reaction mixture comprising 95 to 99.5 wt. % of one or more monomers selected from the group consisting of alkyl (meth)acrylate monomers and 0.1 to 5 wt. % of one or more monomers selected from cross-linking monomers, graft-linking monomers, and mixtures thereof;
2) Forming the second stage by emulsion polymerization of the product of the first stage polymerization and a reaction mixture comprising 93 to 100 wt. % of monomers selected from the group consisting of alkyl (meth) acrylate monomers, 0 to 5 wt. % of one or more monomers selected from cross-linking monomers, graft-linking monomers, and mixtures thereof, and 0 to 2.0 wt. % of chain transfer agents;
3) Forming the third stage by emulsion polymerization of the product of the second stage polymerization and a reaction mixture comprising 98.5 to 100 wt. % of one or more monomers selected from the group consisting of alkyl (meth)acrylate monomers, styrenic monomers, and mixtures thereof, and 0 to 1.5 wt. % of one or more chain transfer agents; and
4) Forming the fourth stage by emulsion polymerization of the product of the third stage polymerization and a reaction mixture comprising one or more monoethylenically unsaturated ester monomers, a chain transfer agent in an amount of 0.1 to 10 wt. %, and a crosslinker in an amount of 0.1 to 10 wt. %, provided the amount of crosslinker in moles is less than the amount of chain transfer agent in moles.

13. The process according to claim 12, wherein the emulsion polymerizations are conducted sequentially in the same reactor.

* * * * *